April 3, 1945.　　F. E. GILBREATH　　2,373,022
LAWN MOWER SHARPENER
Filed April 3, 1944　　2 Sheets-Sheet 1
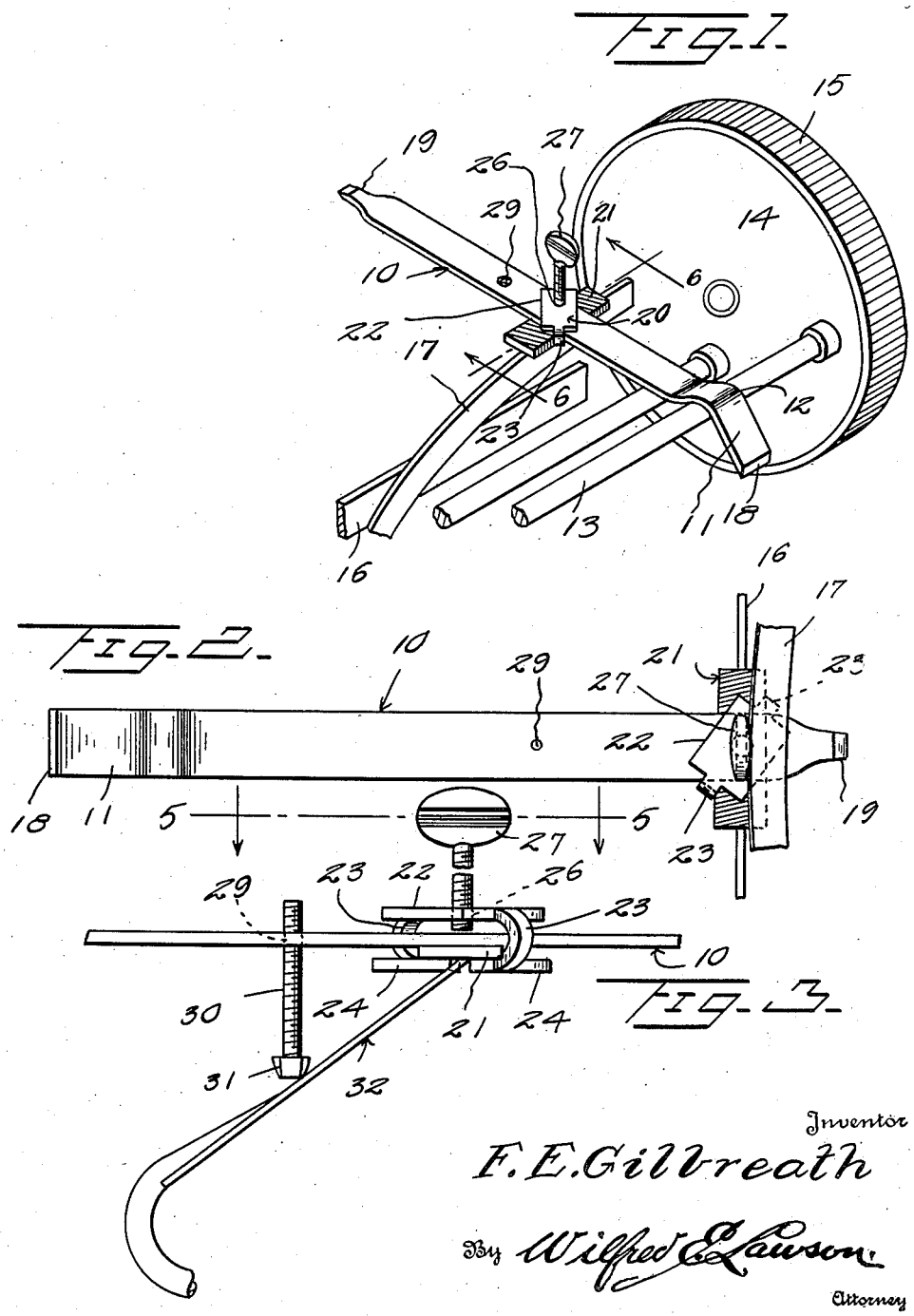

April 3, 1945. F. E. GILBREATH 2,373,022
LAWN MOWER SHARPENER
Filed April 3, 1944 2 Sheets-Sheet 2
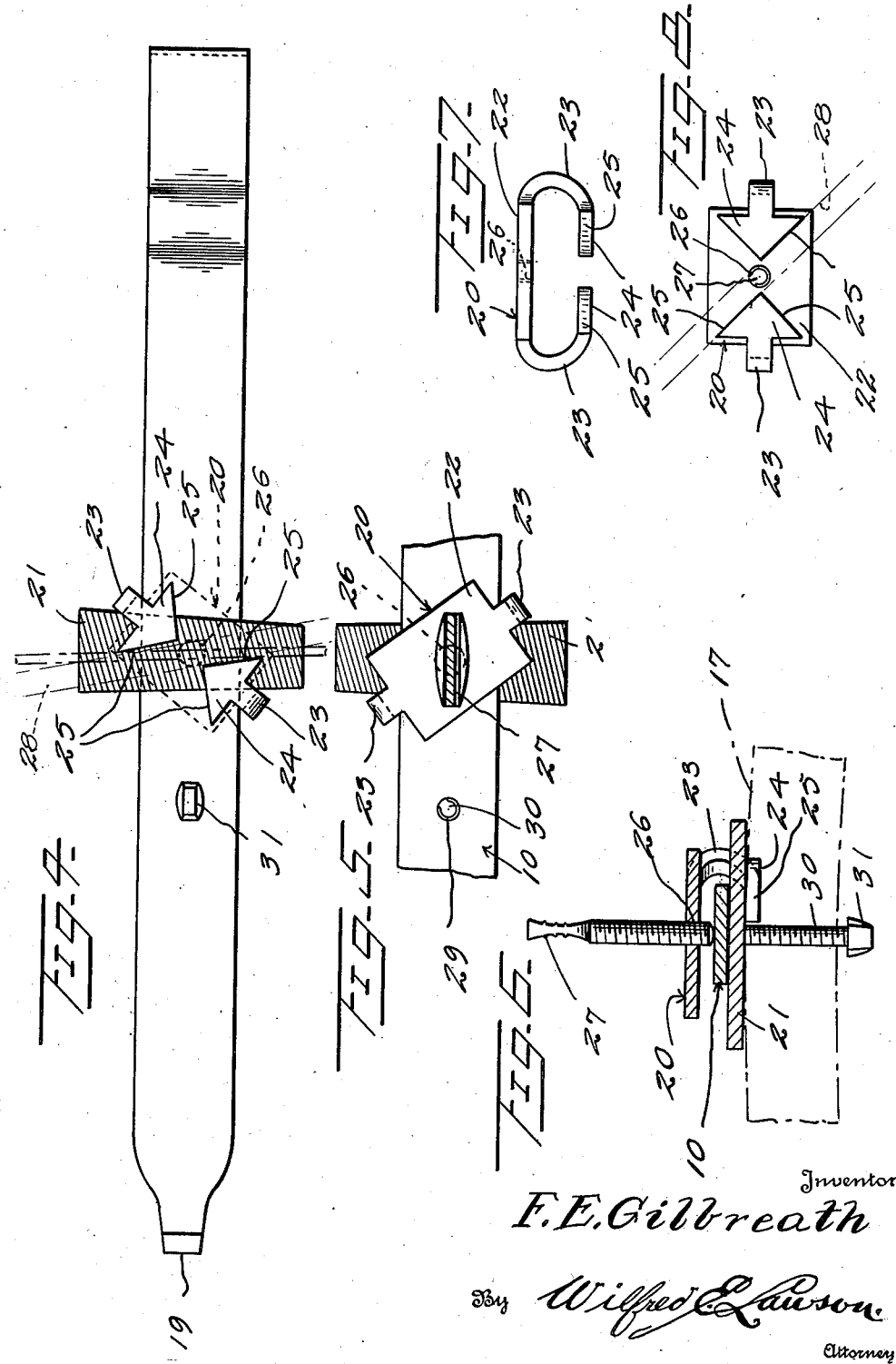
Inventor
F.E.Gilbreath
By Wilfred E. Lawson
Attorney Patented Apr. 3, 1945

2,373,022

UNITED STATES PATENT OFFICE 2,373,022

LAWN MOWER SHARPENER

Frederick E. Gilbreath, Pasadena, Calif., assignor to John J. O'Reilly, Los Angeles, Calif.

Application April 3, 1944, Serial No. 529,315

3 Claims. (Cl. 76—82)

This invention relates generally to the class of tools and pertains particularly to improvements in sharpening tools designed especially for the sharpening of the cutting blades and the shear of a lawn mower.

A principal object of the present invention is to provide a lawn mower blade and shear sharpening tool having a novel file carrying or securing clamp for maintaining the sharpening file in position upon a supporting handle or bar, wherein the clamp is formed to receive the mower blade to effect the proper maintenance of the blade in position against the file and to cause the blade reel to turn as necessary during the sharpening operation, as the handle or bar is moved in a fixed path.

Another object of the invention is to provide in a sharpening tool of the character stated, a novel means of clamping the sharpening file to the tool or bar, such clamping means being cut and shaped from a single piece of material to provide the file holder and two spaced head portions having parallel spaced edges which cooperate as a guiding means for the blade or for the shear of the mower.

Other objects and advantages of the invention will become apparent as the description of the same proceeds and the invention will be best understood from a consideration of the following detailed description taken in connection with the accompanying drawings forming a part of this specification, it being understood however, that minor changes and modifications may be made in the structure so long as such changes and modifications are within the scope of the appended claims.

In the drawings:

Figure 1 is a view in perspective of the sharpening tool applied to a mower reel blade.

Figure 2 is a view in plan illustrating the application of the tool to the shear for the sharpening of the latter.

Figure 3 illustrates the application of the tool to a hoe blade.

Figure 4 is a view in plan, on an enlarged scale, of the tool showing in broken lines the position of a reel blade with respect to the file.

Figure 5 is a section taken substantially on the line 5—5 of Figure 3.

Figure 6 is a section taken on the line 6—6 of Figure 1.

Figure 7 is a detailed view in side elevation of the file clamp frame.

Figure 8 is a view looking at the under side of the clamp.

Referring now more particularly to the drawings it will be seen that the main body portion of the present implement, which comprises what may be referred to as the handle, consists of a flat bar 10 of substantial length and of suitable width and thickness. This bar at its forward end has a portion obliquely directed as indicated at 11 and the part between the oblique portion 11 and the main body portion of the bar is slightly offset to form the transverse guide channel 12 which is designed to receive a coupling or brace bar such as is commonly found in lawn mowers, forming a connection between the sides of the mower frame upon which the mower wheels are mounted. Such bar is here designated 13 while the mower frame portions between which the bar is connected, are designated 14 and the mower wheels 15. The mower shear in cooperation with which the blades of the cutting reel function, is designated 16 while the blades are designated 17.

The end of the oblique portion 11 of the bar or handle is sharpened as indicated at 18 to provide a scraping tool for use in removing adhering mud, dirt or matted grass from the blade, shear bar or other part of the mower while the opposite end of the bar 10 is reduced in width and suitably tapered to form a screw-driver 19, for use in making the necessary adjustments of the parts of the machine.

The numeral 20 generally designates a clamp for maintaining in position against one side of the handle bar 10, the cutting file 21, by means of which the desired sharpening of either the reel blade 17 or the shear 16 is obtained The clamp 20 is formed from a single piece of material and consists of a central plate portion 22 which is slightly elongated as shown, from the central part of each end of which extends an arm 23 which terminates in an arrow like head 24 having the relatively widely divergent edges 25.

The end arms 23 of the plate 22 are bent around so as to bring the points of the heads 24 in opposing spaced relation and spaced from one side face of the plate 22 a sufficient distance to receive between the plate and the heads, the body of the handle bar 10 and the file 21.

The central part of the plate 22 has a threaded opening 26 formed therethrough for the reception of the threaded shank of a bench bevel headed thumb screw 27.

When the file clamp 20 is in working position the plate portion 22 extends obliquely across a side of the bar 10 as shown in Figure 5, the arms extending around across the opposite sides of the bar and across the inserted file 21 and as shown in Figure 4, the heads 24 of the clamp are arranged so that an edge 25 of one head is parallel with but spaced from a corresponding edge of the opposite head thereby forming a guide or trackway 28 lengthwise of the file 21 and transversely of the bar 10, for the reception of the cutting edge of a blade 17 of the mower when the tool is placed in the proper position on the machine.

In the use of the tool for the sharpening of a blade the head end of the bar is placed across a brace bar or rod such as that indicated at 13, of the mowing machine to receive such rod in the guide channel 12. The clamp 20 is then adjusted to the proper position upon the bar so as to receive an edge of a blade in the track or guideway 28, the file, of course, having been properly set to cut the blade when the tool is drawn along the machine bar 13.

Because of the guide 28, as the tool is drawn along, the blade reel will be turned so that the edge of the blade will be cut or sharpened at the correct angle.

In using the tool for the sharpening of the shear the sharpening tool is reversed, the clamp being shifted to a position adjacent the rear or tail end of the handle. Since the tool will be turned around it will, of course, be necessary to reverse the file in the clamp and consequently use will be made of the track or guide formed by the other two parallel edges 25 of the clamp heads 24.

In the sharpening of the shear use is made of the bevel headed thumb screw 27. The shear has to be sharpened accurately the same as the cycle or reel blades, therefore, to cut the shear evenly throughout its entire length, the bevel or hollow ground side of the thumb set screw 27 acts as a guide on which the cycle or reel blade travels.

The present implement may also be employed for sharpening a garden hoe. In order to make use of the implement for this purpose there is formed in the bar 10 a tapped hole 29 in which is threaded a screw 30 which has a bevel head 31. By threading this screw inwardly or outwardly the head may be brought to a position where the blade of a garden hoe can be set at the proper angle for the sharpening of its working edge, which edge would be disposed upon the face of the file 21 secured in the proper position to the bar 10 by the clamp 20 as illustrated in Figure 3. The hoe blade as shown in position for sharpening, is designated 32.

From the foregoing it will be seen that the implement embodying the present invention is so designed as to have a number of uses in connection with the repairing and maintenance of lawn mowers and may also be readily employed for sharpening other garden implements such as the hoe here illustrated.

I claim:

1. A lawn mower reel blade and shear sharpening implement comprising a bar constituting a handle, and a file securing clamp member for securing a file in position transversely of one side of the bar, said clamp comprising a plate, a pair of arms of a width materially less than the width of the plate and extending from the center of opposite edges of the plate and curving inwardly into end opposed spaced relation and having spaced relation with a side face of the plate, the plate being disposed to extend obliquely across the bar and obliquely across a file disposed perpendicular to the bar, the file and bar lying between the ends of the arms and the body of the plate, a screw secured to the plate for engagement with a side of the bar opposite from the ends of the arms, and said arms terminating each in a pointed head having widely diverging side edges, the line of one of the side edges of one head being in spaced parallel relation with the line of a side edge of the other head to form a blade guide.

2. A lawn mower reel blade and shear sharpening implement, comprising a bar constituting a handle, and a clamp member designed to secure a file in position transversely of one side of the bar, said clamp comprising a plate, a pair of arms extending from opposite edges of the plate and curving into end opposed spaced relation with a side face of the plate, the bar being adapted to extend with a file between the ends of the arms and the body of the plate, a screw secured to the plate for engagement with a side of the bar opposite from the ends of the arms, said arms each terminating in a pointed head having widely diverging side edges, one of the side edges of one head being in spaced parallel relation with a side edge of the other head to form a blade guide, and said screw having a bevel head for co-action with an element of a mower in the use of the implement for the sharpening of the mower shear.

3. A lawn mower reel blade and shear sharpening implement, comprising a bar constituting a handle, and a clamp member designed to secure a file in position transversely of one side of the bar, said clamp comprising a plate, a pair of arms extending from opposite edges of the plate and curving into end opposed spaced relation with a side face of the plate, the bar being adapted to extend with a file between the ends of the arms and the body of the plate, a screw secured to the plate for engagement with a side of the bar opposite from the ends of the arms, said arms each terminating in a pointed head having widely diverging side edges, one of the side edges of one head being in spaced parallel relation with a side edge of the other head to form a blade guide, and a second screw threaded in an opening in the bar and paralleling the first screw, said second screw having a bevel head for engagement with and the maintenance of an implement at a desired angle with respect to the cutting face of the file secured by the clamp.

FREDERICK E. GILBREATH.